(12) United States Patent
Ray et al.

(10) Patent No.: US 6,793,993 B2
(45) Date of Patent: Sep. 21, 2004

(54) FIRE RESISTANT POLYMERIC FILM AND INSULATION ASSEMBLY

(75) Inventors: Richard J. Ray, Downingtown, PA (US); Blake Boyd Bogrett, Littleton, CO (US); Majid Hindi, Denver, CO (US); Loye Dwayne Fant, Garland, TX (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/223,642

(22) Filed: Aug. 19, 2002

(65) Prior Publication Data

US 2003/0008093 A1 Jan. 9, 2003

Related U.S. Application Data

(63) Continuation of application No. 09/572,030, filed on May 16, 2000, now abandoned.

(51) Int. Cl.$^7$ ............................................. B29D 22/00
(52) U.S. Cl. .................. 428/35.2; 428/36.91; 428/215; 428/516; 428/921
(58) Field of Search ................................ 428/516, 215, 428/323, 36.9, 36.91, 523, 696, 920, 921, 34.3, 35.7, 35.9, 36.1, 36.2, 53, 913; 442/76, 117, 126, 131, 136, 139, 140, 144, 145, 146, 286, 287, 290, 394, 395, 398; 220/560.01

(56) References Cited

U.S. PATENT DOCUMENTS 5,811,359 A * 9/1998 Romanowski .............. 442/261
6,153,716 A * 11/2000 Welch et al. ............... 526/352
6,357,504 B1 * 3/2002 Patel et al. ................. 156/499
6,579,922 B2 * 6/2003 Laurent ...................... 524/240

OTHER PUBLICATIONS

Derwent Abstract Translation of RD 225024 A (Derwent Acc. No. 1983–14008K).*

* cited by examiner

Primary Examiner—Paul Thibodeau
Assistant Examiner—Kevin Bernatz
(74) Attorney, Agent, or Firm—Robert D. Touslee

(57) ABSTRACT

A fire resistant resilient insulation assembly, includes: a resilient insulation and a fire resistant polymeric film forming a tubular envelope surrounding the resilient insulation. The fire resistant polymeric film includes: 50 to 80 weight percent high density polymeric material; 5 to 45 weight percent linear low density polymeric material; 5 to 25 weight percent fire retardant concentrate (a halogen and a synergist in a polymeric carrier); 0 to 5 weight percent UV stabilizer; and 0 to 10 weight percent pigment. Preferably, the film is a two layer coextruded film with the outer layer being a predominately linear low density polymer that provides a good finish for printing and a relatively high coefficient of friction to improve the handling of the film during the encapsulation of the blanket. The inner layer is predominately high density polymer that provides the coextruded film with the impact strength and tear resistance required for processing and handling.

3 Claims, 1 Drawing Sheet

FIRE RESISTANT POLYMERIC FILM AND INSULATION ASSEMBLY

This application is a continuation of application Ser. No. 09/572,030 filed May 16, 2000 now abandoned.

BACKGROUND OF THE INVENTION

The present invention relates to a fire resistant polymeric film and insulation assembly, and, in particular, to an insulation assembly including a resilient insulation (such as but not limited to a glass fiber insulation) within a polymeric film envelope wherein the polymeric film envelope is fire resistant throughout or at least has an exposed surface layer that is fire resistant. The fire resistant insulation assembly of the present invention is especially suited for under floor and other applications where the insulation assembly is exposed on at least one side.

One form of encapsulated insulation assembly currently utilized to insulate residential, commercial and industrial buildings and other structures includes resilient fibrous insulation blankets that are made of glass or other insulation fibers. The fibrous insulation blankets are typically in roll or batt form and are enclosed within polymeric film envelopes to encapsulate any dust and/or loose insulation fibers within the insulation assemblies and avoid direct handling of the fibrous insulations which might cause irritation.

Most encapsulated insulation assemblies used in the insulation of residential, commercial and industrial buildings, such as polymeric film encapsulated glass fiber insulation assemblies, are enclosed within the walls or ceilings of the buildings and thus, are shielded from direct contact with the flames of a fire within the building at the initiation of a fire by the building panels, e.g. dry wall or other building panels enclosing the insulation assemblies within the wall or ceiling. However, in certain insulating applications the encapsulated insulation assemblies are exposed on at least one side, e.g. in under floor applications and in some garage or other applications where no dry wall or other building panels are used to form an interior wall. For these exposed applications, the encapsulated insulation assemblies may easily be directly exposed to flames at the initiation of a fire. Thus, there has been a need to provide self extinguishing polymeric film encapsulated insulation assemblies that will not facilitate the spread of a fire in either enclosed or exposed applications, but especially for exposed applications where the insulation assemblies are more likely to be exposed directly to the flames of a fire at the initiation of a fire.

High density polymeric films that are used to encapsulate fibrous insulation blankets normally have a low coefficient of friction and are quite slippery. The slippery nature of these polymeric films can create processing problems in the automatic encapsulating equipment utilized to encapsulate the fibrous insulation blankets within the polymeric film envelopes and result in reduced production efficiencies in the encapsulation portions of the manufacturing process. Thus, in addition to the need for self extinguishing polymeric films, there has been a need to provide such films with good handling characteristics (i.e. exterior surfaces with coefficients of friction sufficiently high to improve the processing of the polymeric films through the encapsulating equipment) without reducing the integrity required for such films in the encapsulating process or the later handling of the encapsulated insulation assemblies and while providing a good printing surface on the exterior surfaces of such polymeric films.

SUMMARY OF THE INVENTION

The fire resistant resilient insulation assembly of the present invention provides a solution to the above discussed problems by providing an encapsulated insulation assembly with a self extinguishing, essentially dripless, polymeric film envelope. The fire resistant polymeric film of the envelope has: the integrity required for the processing of the film during the encapsulating process and the later handling of the insulation assembly; and an exterior surface with a finish suited for printing and a relatively high coefficient of friction to facilitate the processing of the film during the encapsulating process and later handling of the insulation assembly. The term "self extinguishing" as used herein means that when the polymeric film is removed from contact with an open flame, the polymeric film will not support continued combustion. The term "essentially dripless" as used herein means that when an open flame is applied to the polymeric film, the polymeric film will burn and/or melt away at the flame front, but there is little or no dripping of the polymeric material as the polymeric film is being consumed by the flame.

The fire resistant insulation assembly of the present invention, includes: a resilient insulation and a fire resistant polymeric film or films forming a tubular envelope surrounding the resilient insulation. Preferably, the fire resistant polymeric film includes: 50 to 80 weight percent high density polymeric material; 5 to 45 weight percent linear low density polymeric material; 5 to 25 weight percent fire retardant comprising a halogen and a synergist in a polymeric carrier; 0 to 5 weight percent UV stabilizer; and 0 to 10 weight percent pigment, e.g. titanium dioxide.

Preferably, the polymeric encapsulating film forming the envelope or at least the exposed side of the envelope in the insulation assembly is a two layer coextruded film. The outer layer of the film is formed from a predominately linear low density polymer, e.g. a linear low density polyethylene, to provide the insulation assembly with a surface finish that is well suited for printing, e.g. logos, instructions, etc., and a coefficient of friction that facilitates the handling of the film though the encapsulating equipment. The predominately linear low density polymeric film layer also provides increased machine direction tear resistance. The inner layer of the two layer coextruded film is formed from a predominately high density polymer, e.g. a high density polyethylene, to provide the coextruded polymeric film the integrity (impact strength and tear resistance) required for processing and handling.

DESCRIPTION OF THE PREFERRED EMBODIMENTS

Figure 1:
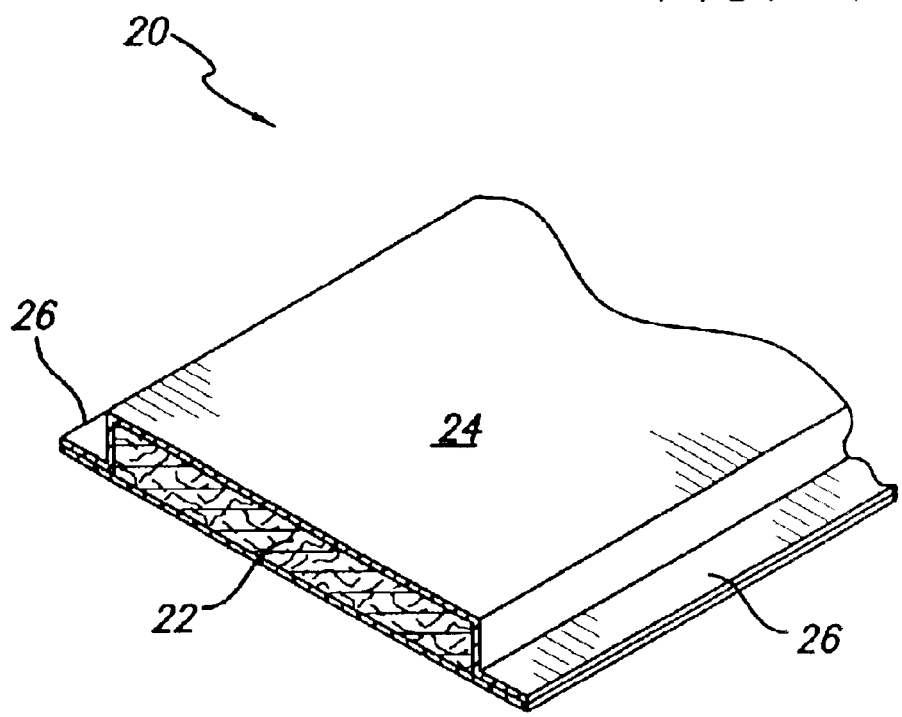
FIG. 1 is a schematic perspective view of a first embodiment of the fire resistant insulation assembly of the present invention.
Figure 2:
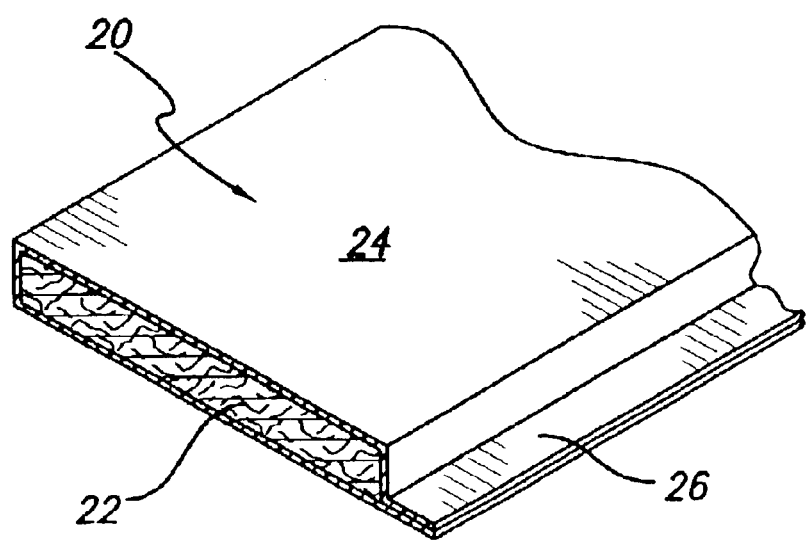
FIG. 2 is a schematic perspective view of a second embodiment of the fire resistant insulation assembly of the present invention.

As shown in FIGS. 1 and 2, the fire resistant insulation assembly 20 of the present invention includes a blanket of fibrous insulation 22, such as but not limited to glass fiber building insulation, and a polymeric film envelope 24 encapsulating the fibrous insulation blanket 22. The fibrous insulation blanket 22 is normally in roll or batt form and typically, the width, thickness and length of the insulation blanket are standard for such insulation products.

As shown in FIG. 1, the polymeric film envelope 24 includes a facing and a backing which are heat sealed, adhesively bonded or otherwise bonded or sealed together along their lateral edges to encapsulate the fibrous insulation blanket 22 within the envelope and form tabs 26 that can be used to secure the insulation assembly 20 to frame members of a building, such as floor or ceiling joists or wall studs. As shown in FIG. 2, the envelope 24 can also be made from a single sheet of polymeric film wrapped and sealed about the fibrous insulation blanket 22 with a single tab 26. While the ends of the insulation assemblies 20 are generally open, if desired, the ends of the polymeric film envelopes 24 can also be closed about the fibrous insulation blanket 22. While the fire resistant polymeric films of the present invention are typically used alone, the fire resistant polymeric films of the present invention can be combined with other film layers when making the insulation envelope 24.

The polymeric films forming the envelopes 24 are preferably made from polyolefin resins and more preferably from polyethylene resins. While the polymeric films forming the envelopes 24 can be a single layer, preferably, the films are coextruded (e.g. in pocket or high stalk coextruded) with a predominately linear low density polymeric film layer forming the outer or exposed layer of the polymeric film envelope 24 (preferably, a linear low density polyethylene) and a predominately high density polymeric film layer forming the inner layer of the polymeric film envelope (preferably, a high molecular weight, high density polyethylene).

The predominately linear low density polymeric film layers of the envelopes 24 include class 1 films ranging from 0.910 to 0.925 grams per cubic centimeter and class 2 films ranging from 0.926 to 0.940 grams per cubic centimeter and the predominately high density polymeric (high molecular weight, high density polymers) film layers of the envelopes 24 include class 3 films ranging from 0.941 to 0.959 grams per cubic centimeter and class 4 films beginning at 0.960 grams per cubic centimeter. The predominately linear low density polymeric film layer provides the exterior surface of the envelope 24 with a finish that is better suited for printing than a predominately high density polymeric film layer would provide, thereby enhancing the graphics (logos, instructions, etc.) printed on the envelope. The predominately linear low density polymeric film layer also provides the exterior surface of the envelope 24 with a coefficient of friction that is about 50% or more greater than the coefficient of friction of the surface of the inner predominately high density polymeric film layer. The predominately linear low density polymeric film layer also improves the tear resistance of the coextruded film in the machine direction to improve handling properties of the film during the encapsulation process. The inner predominately high density polymeric film layer provides the polymeric film used to form the envelope with the added integrity (impact and tear strength) required for processing and handling.

The fire resistant polymeric film used to form the envelope 24 preferably ranges from about 0.25 to about 2.0 mils in thickness and more preferably, about 0.6 mils to about 1.5 mils in thickness. Preferably, the predominately linear low density polymeric film layer forms between 10% and 30% of the film thickness and the predominately high density polymeric film layer forms between 70% and 90% of the film thickness. With this structure, the predominately linear low density polymeric film layer has the thickness required to provide a good printing surface on the coextruded polymeric film and the predominately high density polymeric film layer has the thickness required to provide the coextruded polymeric film with the necessary impact strength and tear resistance in both the machine and cross machine directions. For example, in one preferred embodiment of the present invention, the outer predominately linear low density polymeric film layer is about 0.10 mils in thickness and the inner predominately high density polymeric film layer is about 0.60 mils in thickness.

The composition of the fire resistant polymeric film forming the envelope in weight percent is as follows:

|  | COMPOSITE | OUTER LAYER | INNER LAYER |
| --- | --- | --- | --- |
| HD POLYMER | 50–80 | 0–50 | 30–90 |
| LLD POLYMER | 5–45 | 50–100 | 0–40 |
| FIRE RETARDANT | 5–25 | 5–25 | 5–25 |
| UV STABILIZER | 0–5 | 0–10 | 0–10 |
| PIGMENT | 0–10 | 0 | 0–10 |

The high molecular weight, high density polymers and the linear low density polymers have been described above. The fire retardant is a concentrate that includes a halogen (preferably bromine) and a synergist (preferably antimony trioxide) carried in a low density polymeric carrier such as a low density polyethylene or a linear low density polyethylene. The fire retardant may also include clay. In a preferred fire retardant concentrate, the bromine is about 60% by weight of the fire retardant concentrate, the antimony trioxide is about 20% by weight of the fire retardant concentrate, and the low density polymeric carrier (e.g. polyethylene) with the clay additive is about 20% by weight of the fire retardant concentrate. An example of a commercially available fire retardant concentrate is PM 1605E4 White Flame Retardant, sold by Techmer PM, LLC Polymer Modifiers. Typically, the UV stabilizers are hindered amine light stabilizers (HALS). An example of a pigment which can be used to increase the opacity of the films is titanium dioxide.

The polymeric films of the present invention are manufactured by forming extrudable blends or mixtures of polymeric resins (preferably polyethylene) with the fire retardant additive and other additives such as a UV stabilizer and pigments added in the percent ranges set forth above. The blending or mixing of the polymeric resins and additives may be performed in a conventional blender, in an extruder, or through the use of other conventional blending or mixing means. The polymeric resin films, of selected thicknesses and densities and containing the additives, are formed from the extrudable polymeric resin blends or mixtures by extruding the blends or mixtures through conventional extruders, e.g. in pocket or high stalk coextruders, in a blown film extrusion process. These films are then formed into envelopes, generally open ended envelopes, about the fibrous insulation blankets to encapsulate the fibrous insulation blankets 22.

To compare the fire resistant encapsulated insulation assemblies of the present invention with standard encapsulated insulation assemblies, fire tests were performed on encapsulated glass fiber insulation assemblies using a standard 0.7 mil coextruded polyethylene film for the encapsulating envelopes and a 0.7 mil coextruded polyethylene film of the present invention, including 15 weight percent fire retardant, for the encapsulating envelopes. Vertical, horizontal and lighter tests were performed.

In the vertical test, encapsulated insulation assemblies (about 96 inches high by about 20 inches wide) were mounted on a frame with the major surfaces of the encapsulated insulation assemblies extending vertically. The vertically extending polyethylene film surfaces of both encapsulated insulation assemblies were each exposed to the flame of a Bunsen burner. Upon exposure to the Bunsen burner flame, both films melted at the exposure point and up vertically twelve to fifteen inches. With respect to the standard polyethylene film, the film ignited three seconds after exposure to the flame and began dripping twenty three seconds after exposure to the flame. Throughout the test, the film burned with visible flames and melted film dripped. Smoke was also visible throughout the test. Three minutes and thirteen seconds after the start of the test, the film was no longer burning and an area of film about twelve to fifteen inches high by fifteen to twenty inches wide had burned/melted. With respect to the fire resistant film of the present invention, the film ignited seven seconds after exposure to the flame and smoke was noted. However, within seconds, the flame self extinguished with no visible dripping or smoke. Throughout the remainder of the test, the same time period as the test for the standard polyethylene film, no subsequent ignition took place, even though the insulation assembly was still exposed to the burner. At the completion of the test, an area of film about twelve to fifteen inches high and about seven to eight inches wide had burned/melted.

In the horizontal test, encapsulated insulation assemblies (about thirty three inches wide by about four feet long) were mounted on a frame with the major surfaces of the encapsulated insulation assemblies extending horizontally. The horizontally extending polyethylene film surfaces of both encapsulated insulation assemblies were each exposed to the flame of a benzene torch. The standard polyethylene film ignited four seconds after its exposure to the flame and at twenty one seconds all film was observed to have burned/melted. The film began to drip after ignition and continued to drip until the majority of the film was consumed. The fire resistant polyethylene film of the present invention ignited five seconds after its exposure to the flame. Unlike the standard polyethylene film, the flame propagation was much slower. At fifty three seconds, the film was completely self extinguished. Some dripping occurred during the burning of the film, but stopped when the flame self extinguished. At the completion of the test an area about thirty three inches wide by about three feet had burned/melted. Unburned film was still attached to the frame toward the edges and corners of the encapsulated insulation assembly.

In the lighter test, unburned vertically extending portions of the films from the vertical test were each exposed to the flame of a lighter, i.e. a lighter sold by BIC corporation under the trademark "Bic". After a few passes of the lighter flame over the standard polyethylene film, the film ignited with the flame propagating in all directions. Burning lasted for over sixty seconds. During that period smoke and dripping occurred and an area about eighteen inches high by about eight to ten inches wide was burned/melted. After a few passes of the lighter flame over the fire resistant film of the present invention, the film ignited, but self extinguished within about fifteen seconds. The flame propagated much slower than the flame of the standard film and an area about twelve inches high by about two to five inches wide was burned/melted.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fire resistant, resilient insulation assembly, consisting of:

a resilient fibrous insulation blanket and a self extinguishing coextruded polyethylene film; the coextruded polyethylene film forming an envelope surrounding the resilient fibrous insulation blanket on at least four sides; the coextruded polyethylene film consisting of a first outer film layer and a second inner film layer; the first outer film layer being a predominately linear low density polyethylene material including a fire retardant concentrate comprising a halogen and a synergist; the second inner film layer being a predominately high density polyethylene material; the first outer film layer forming between 10% and 30% of the coextruded polyethylene film thickness; the second inner film layer forming between 70% and 90% of the coextruded polyethylene film thickness; and the coextruded polyethylene film comprising:

50 to 80 weight percent high density polyethylene material,
5 to 45 weight percent linear low density polyethylene material,
5 to 25 weight percent fire retardant concentrate comprising a halogen and a synergist,
0 to 5 weight percent UV stabilizer, and
0 to 10 weight percent pigment;

with the first outer film layer of the coextruded polyethylene film comprising:

0 to 50 weight percent high density polyethylene material,
50 to 95 weight percent linear low density polyethylene material,
5 to 25 weight percent fire retardant concentrate comprising a halogen and a synergist, and
0 to 10 weight percent UV stabilizer; and with the second inner film layer of the coextruded polyethylene film comprising:

30 to 90 weight percent high density polyethylene material,
0 to 40 weight percent linear low density polyethylene material,
5 to 25 weight percent fire retardant concentrate comprising a halogen and a synergist,
0 to 10 weight percent UV stabilizer, and
0 to 10 weight percent pigment.

2. The fire resistant insulation assembly according to claim 1, wherein:

the fire retardant concentrate is 10 to 20 weight percent of the first layer and 10 to 20 weight percent of the second layer.

3. The fire resistant insulation assembly according to claim 2, wherein:

the fire retardant concentrate comprises bromine and antimony trioxide in a polymeric carrier.

* * * * *